(12) United States Patent
Chun

(10) Patent No.: US 10,158,277 B2
(45) Date of Patent: Dec. 18, 2018

(54) HAPTIC ACTUATOR

(71) Applicant: G2HYSONIC CO., LTD., Ansan-si, Gyeonggi-do (KR)

(72) Inventor: Se Jun Chun, Ansan-si (KR)

(73) Assignee: G2HYSONIC CO., LTD., Ansan-si (KR)

( * ) Notice: Subject to any disclaimer, the term of this patent is extended or adjusted under 35 U.S.C. 154(b) by 164 days.

(21) Appl. No.: 15/111,137

(22) PCT Filed: Jun. 29, 2015

(86) PCT No.: PCT/KR2015/006643
§ 371 (c)(1),
(2) Date: Jul. 12, 2016

(87) PCT Pub. No.: WO2016/021834
PCT Pub. Date: Feb. 11, 2016

(65) Prior Publication Data
US 2016/0336842 A1     Nov. 17, 2016

(30) Foreign Application Priority Data

Aug. 7, 2014 (KR) .......................... 10-2014-0101456

(51) Int. Cl.
*H02K 33/02* (2006.01)
*H02K 33/16* (2006.01)
*H02K 1/34* (2006.01)
*H02K 7/18* (2006.01)

(52) U.S. Cl.
CPC ............. *H02K 33/02* (2013.01); *H02K 33/16* (2013.01); *H02K 1/34* (2013.01); *H02K 7/1869* (2013.01)

(58) Field of Classification Search
CPC ........ H02K 1/34; H02K 7/065; H02K 7/1869; H02K 7/1876; H02K 33/00; H02K 33/02; H02K 33/16; B06B 1/04; B06B 1/045
(Continued)

(56) References Cited

U.S. PATENT DOCUMENTS 7,960,875 B2 * 6/2011 Higuchi .................. B06B 1/045
310/15
8,878,401 B2 * 11/2014 Lee ........................ H02K 33/16
310/15
(Continued)

FOREIGN PATENT DOCUMENTS

JP      11-178304 A      7/1999
JP   2011-245409 A     12/2011
(Continued)

*Primary Examiner* — Thomas Truong
*Assistant Examiner* — Minki Chang
(74) *Attorney, Agent, or Firm* — Novick, Kim & Lee, PLLC; Jae Youn Kim

(57) ABSTRACT

The present invention relates to a haptic actuator, and the vibrating body includes a first magnet and a second magnet that are disposed on one end of the coil member in the vertical direction to be spaced apart from each other; a third magnet and a second magnet that are disposed on the other end of the coil member in the vertical direction to be spaced apart from each other; a first magnetic body that is mounted on one end of the first magnet and the third magnet in the horizontal direction; a second magnetic body that is mounted on the other end of the second magnet and the fourth magnet in the horizontal direction; and the first weight and the second weight that is mounted the first magnetic body and the second magnetic body respectively, the polarities of the first magnet and the second magnet having a north pole in the direction facing each other and a south pole in the opposite direction thereof, and the polarities of the third magnet and the forth magnet having a north pole in the direction facing each other and a south pole in the (Continued)

opposite direction thereof, a magnetic field lines emanating from the north poles of the first magnet, the second magnet, the third magnet, and the fourth magnet being to be converged to the coil member.

5 Claims, 7 Drawing Sheets

(58) Field of Classification Search
USPC .......... 310/12.01–12.33, 15, 21, 25, 32, 36; 381/396, 412, 420, 421
See application file for complete search history.

(56) References Cited

U.S. PATENT DOCUMENTS 9,815,085 B2 * 11/2017 Chun .................... H02K 33/16
2011/0018364 A1 * 1/2011 Kim ...................... H02K 33/18
310/17
2011/0266892 A1 * 11/2011 Wauke .................... B06B 1/045
310/25
2012/0169148 A1 * 7/2012 Kim ...................... H02K 33/16
310/25
2012/0169151 A1 * 7/2012 Dong .................... H02K 33/16
310/25

FOREIGN PATENT DOCUMENTS

| KR | 10-2011-0009462 A | 1/2011 |
| KR | 10-1055562 B1 | 8/2011 |
| KR | 10-2011-0125867 A | 11/2011 |
| KR | 10-1224432 B1 | 1/2013 |
| KR | 10-1250288 B1 | 4/2013 |
| KR | 10-1434264 B1 | 9/2014 |

* cited by examiner

HAPTIC ACTUATOR

TECHNICAL FIELD

The present invention relates to a haptic actuator, and more particularly, to a haptic actuator that is built into an electronic device that requires a vibration response by touch such as a mobile terminal and generates vibration by interaction between a coil and a magnet.

BACKGROUND ART

Generally bell sound and vibration are well used for the receipt of communication device. For the vibration, it is a general case that a whole device is able to vibrate by actuating a small vibration generation device and subsequently transferring an actuating force to a case of the device.

Currently, the vibration generation device which is one of the receipt means applied in the communication device such as a cell phone is a component converting electric energy into mechanical vibration by using the generating principle of electromagnetic force and the vibration generation device is installed in a cell phone and is used for silent notice of the receipt.

The vibration generation device is widely used for the purpose of the notice of receipt of the cell phone or the like, and recently the use of vibration generation device is increased as follows, the vibration generation device is installed in a game device in order to inform user thereof of the game progress conditions or the vibration generation device is installed in a touch phone or the like in order for user thereof to know feeling that keys thereof were touched.

The need for product development of a new structure is rising which the drawback of the existing product of the vibration generation device is avoided and its quality is dramatically improved in the state expecting miniaturization and high qualification of the cell phone component following the trend that the cell phone market has been quickly expanded and moreover multi-functions are added to the cell phone.

The vibration generation device of the related art mounted on the portable terminal as a vibration generation device basically using the primary vibration system attaches a weight to an elastic body such as a coil spring and has a coil to vibrate the weight.

The weight vibrates depending on the frequency response characteristics predetermined by the weight and a modulus of elasticity of the elastic body when current is applied to the coil.

As described above, recently the portable terminal launched has a function providing feedback which corresponds to input to user, by outputting voice or vibration response to the user's touch input.

Particularly, in case of the portable terminal applied a haptic technology, the research about the vibration generation device generating the various types of vibrations in order to provide a various of haptic feedback in response to user's various input is underway.

The vibration generation device of the related art, however, generates a vertical actuating power of the weight using Lorentz force between a coil and a fixed magnet, wherein it is difficult to get good characteristics in vibration strength, vibration frequency band width, or the like because of limitation of a structure of the vibration generation device by means of Lorentz force.

Particularly, in the vibration generation device of LRA (Linear Resonant Actuator) method of the related art, there was a problem that the response speed is not fast because there is a limit to the increase in damping value.

RELATED ART DOCUMENTS

1. Korean patent no. 10-1250288
2. Korean patent no. 10-1055562

DISCLOSURE

Technical Problem

The present invention has been made in an effort to solve the above-described problems, and it is an object of the present invention to provide a haptic actuator having more improved performance in response speed, frequency band width or the like according to touch of user by improving magnetic force structure.

Technical Solution

In order to achieve the object, a haptic actuator of the present invention has a case formed an accommodation space in the inside thereof; a coil member fixed to the case, wound on the case in the vertical direction, and connected to a control member to be supplied power from the control member; and a vibrating body disposed on the outside of the coil member and elastically and movably mounted on the accommodation space in the horizontal direction. The vibrating body includes a first magnet and a second magnet that are disposed on one end of the coil member in the vertical direction to be spaced apart from each other; a third magnet and a second magnet that are disposed on the other end of the coil member in the vertical direction to be spaced apart from each other; a first magnetic body that is mounted on one end of the first magnet and the third magnet in the horizontal direction; a second magnetic body that is mounted on the other end of the second magnet and the fourth magnet in the horizontal direction; and the first weight and the second weight that is mounted the first magnetic body and the second magnetic body respectively. The polarities of the first magnet and the second magnet have a north pole in the direction facing each other and a south pole in the opposite direction thereof, and the polarities of the third magnet and the forth magnet have a north pole in the direction facing each other and a south pole in the opposite direction thereof. A magnetic field lines emanating from the north poles of the first magnet, the second magnet, the third magnet, and the fourth magnet is to be converged to the coil member.

The first magnetic body is separated into two magnetic bodies, and the two magnetic bodies are spaced apart from each other and is disposed on the first magnet and the third magnet respectively. The second magnetic body is separated into two magnetic bodies, and the two magnetic bodies are spaced apart from each other and is disposed on the second magnet and the fourth magnet respectively.

The first magnetic body is made of one body and the both ends of the first magnetic body are in contact with the first magnet and the third magnet respectively. The second magnetic body is made of one body and the both ends of the first magnetic body are in contact with the second magnet and the fourth magnet respectively.

Magnetic force enhancing grooves which is recessed in the center direction are provided to the upper end and lower end of the first magnetic body and the second magnetic body respectively.

A first elastic member and a second elastic member which elastically support the vibrating body in the horizontal direction is mounted between the both ends in the horizontal direction of the vibration body and the case, respectively. The first elastic member and the second elastic member is a leaf spring that is bent to be have a wave shape.

The vibrating body further includes a support plate in which a through hole in which the coil member is inserted is provided and in which a seating space on which the first magnet, the second magnet, the third magnet, the fourth magnet, the first magnetic body, the second magnetic body, the first weight and the second weight is mounted is provided. The first elastic member and the second elastic member are mounted between the both ends in the horizontal direction of the support plate and the case, and elastically support to be movable the support plate in the horizontal direction.

A third elastic member and a fourth elastic member which cause acceleration of the vibrating body to be increased by the repulsive force when the vibration body collides with the vibrating body is provided in the both end in the horizontal direction of the coil member, respectively.

Advantageous Effects

A haptic actuator of the present invention as described above has an effect as follows:

The vibrating body becomes a negative stiffness state by the magnetism generated by the structure of the magnetic field lines and a force to be disposed in the center of the coil member is generated to the vibrating body thereby a damping value of the vibrating body is increased and a reaction rate of the vibrating body is faster according to a signal of a control unit.

Further, when the reaction rate of the vibrating body is faster, the reaction according to touch of the mobile terminal in which the haptic actuator is applied is capable of being more quickly transmitted to user thereby being capable of improving quality and performance of the mobile terminal.

Since the magnetic force enhancing grooves are provided to the first magnetic body and the second magnetic body respectively, a magnetic force strength is enhanced to improve driving force of the vibrating body, when the first magnetic body and the second magnetic body are magnetized.

Since the third elastic member and the fourth elastic member is mounted on the both sides of the coil member, respectively, the acceleration of the vibrating body is increased, and thus the reaction rate of the haptic actuator is more increased.

DESCRIPTION OF DRAWINGS

The above and other objects, features and advantages of the present invention will become apparent from the following description of preferred embodiments given in conjunction with the accompanying drawings, in which.

Figure 1:
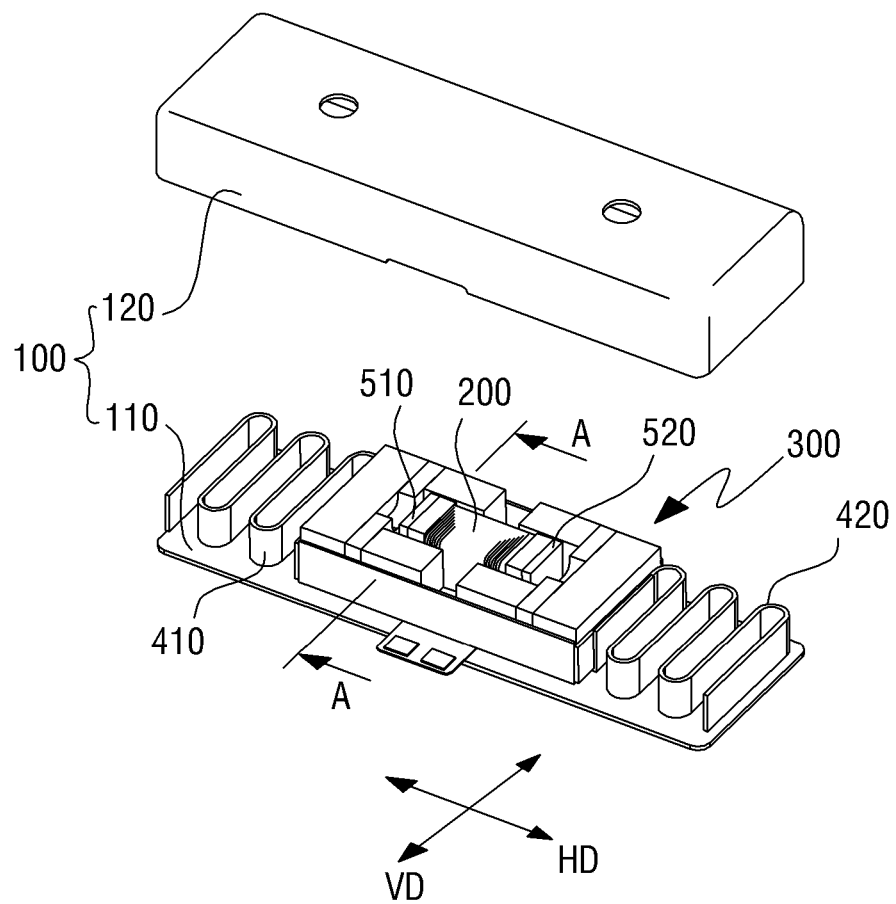
FIG. 1 is a perspective view illustrating a haptic actuator according to an embodiment of the present invention.

| Reference numeral list | |
|---|---|
| 100: case, | 200: coil member, |
| 300: vibrating body, | 310: supporting body, |
| 323: first magnetic body, | 324: second magnetic body, |
| 331: first magnet, | 332: second magnet, |
| 333: third magnet, | 334: fourth magnet, |
| 341: first weight, | 342: second weight, |
| 410: first elastic member, | 420: second elastic member, |
| 510: third elastic member, | 520: fourth elastic member |

BEST MODE

Figure 2:
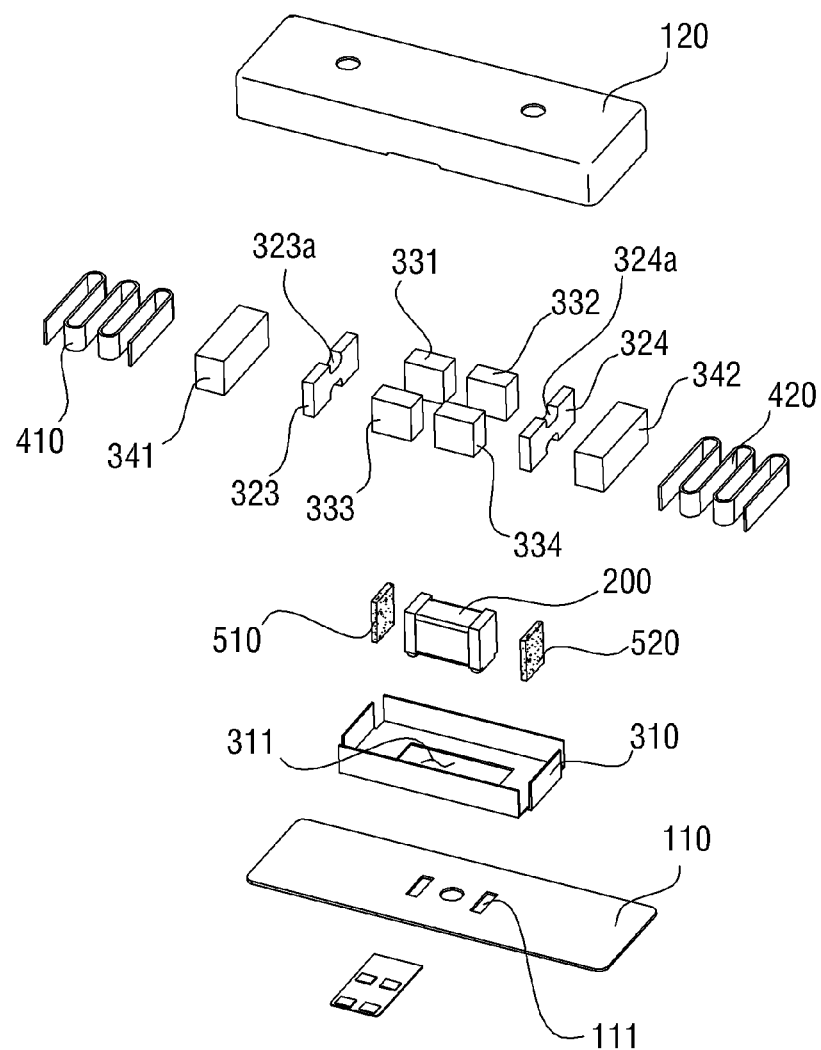
FIG. 2 is an exploded perspective view illustrating the haptic actuator according to an embodiment of the present invention.
Figure 3:
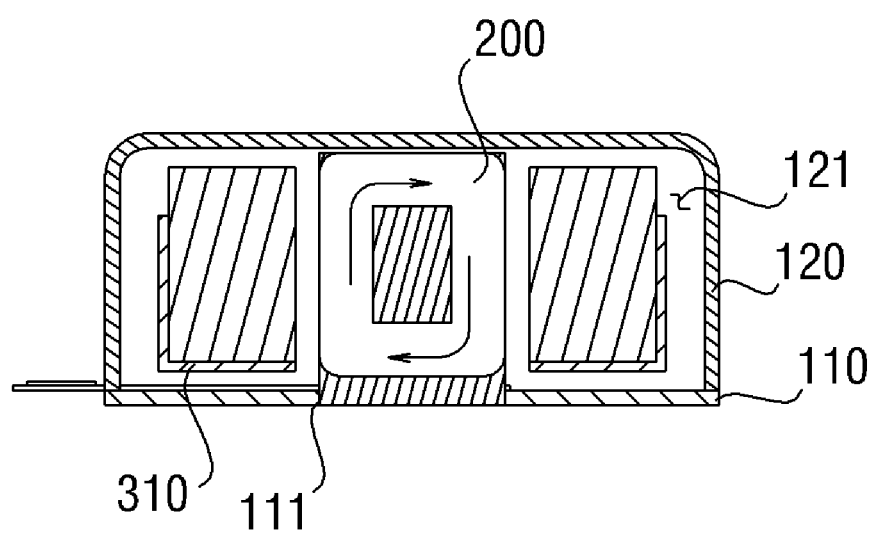
FIG. 3 is a sectional view taken along a line A-A in FIG. 1.
Figure 4:
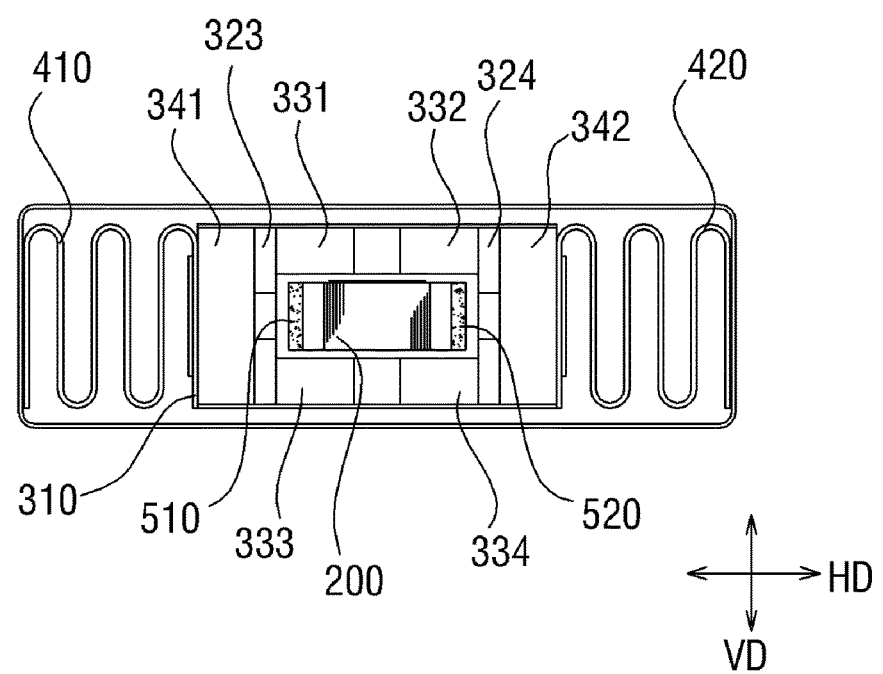
FIG. 4 is a plan view illustrating a structure of the haptic actuator according to an embodiment of the present invention.
Figure 5:
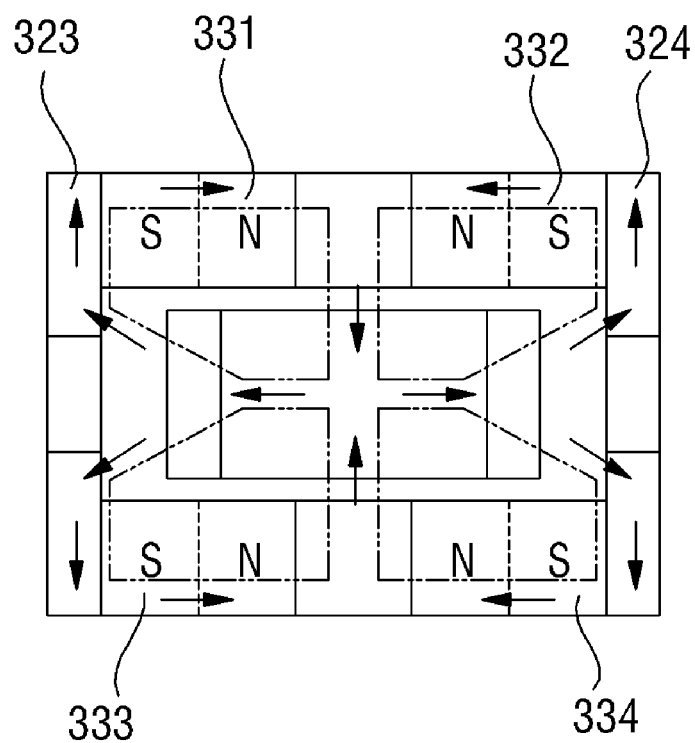
FIG. 5 is a view illustrating a magnetic structure of the vibrating body according to the embodiment of the present invention.
Figure 6:
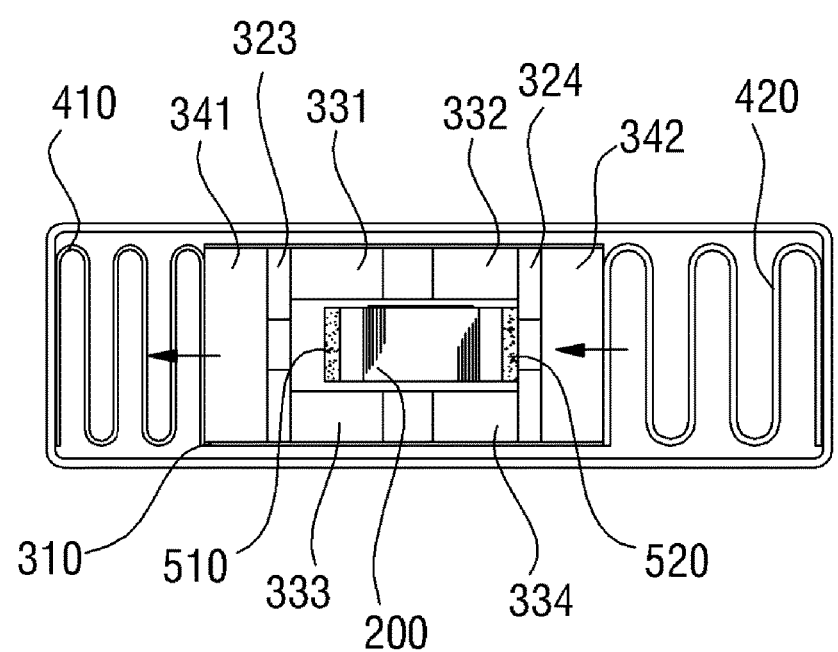
FIG. 6 is a view illustrating an operating state of the haptic actuator according to the embodiment of the present invention.
Figure 7A:
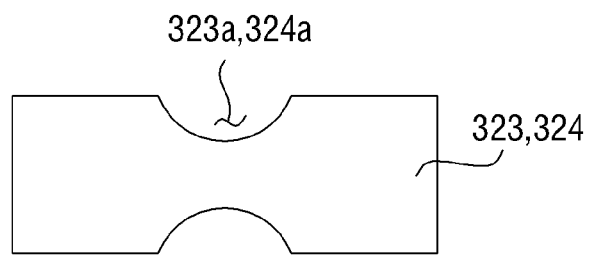
FIGS. 7A-7C are plan views illustrating a structure of the first magnetic body and the second magnetic body according to the embodiment of the present invention.
Figure 7B:
Figure 7C:
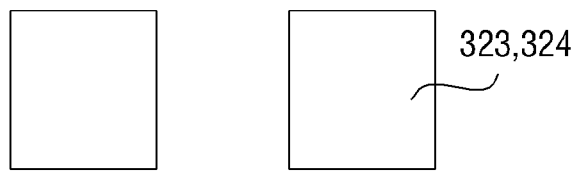

FIG. 1 is a perspective view illustrating a haptic actuator according to an embodiment of the present invention, FIG. 2 is an exploded perspective view illustrating the haptic actuator according to the embodiment of the present invention, FIG. 3 is a sectional view taken along a line A-A in FIG. 1, FIG. 4 is a plan view illustrating a structure of the haptic actuator according to an embodiment of the present invention, FIG. 5 is a view illustrating a magnetic structure of the vibrating body according to the embodiment of the present invention, FIG. 6 is a view illustrating an operating state of the haptic actuator according to the embodiment of the present invention, and FIGS. 7A-7C are plan views illustrating a structure of the first magnetic body and the second magnetic body according to the embodiment of the present invention.

As illustrated in FIGS. 1 to 7, the haptic actuator according to an embodiment of the present invention includes a case 100, a coil member 200, a vibrating body 300, a first elastic member 410, a second elastic member 420, a third elastic member 510, and a fourth elastic member 520.

The case 100 has a long rectangular parallelepiped shape substantially in the horizontal direction HD, that is in the lateral direction, and a nonmagnetic body. Specially, the case 100 includes a bottom plate 110 and a cover 120.

The bottom plate 110 has a long rectangular plate shape in the horizontal direction HD and a fixing hole 111 to which a coil member 200 to be described below is fixed is provided in the center portion thereof.

The cover 120 surrounds the bottom plate 110 to form a receiving portion 121 in which the vibrating body 300 and the coil member 200 are received in the inside thereof, as illustrated in FIG. 3 and which is a space.

The coil member 200 is wound around a bobbin, which is long in the horizontal direction HD, that is, in the lateral direction, in the vertical direction VD. The coil member 200 is fixed to the bottom plate 110.

In other words, the coil member 200 is manufactured by a lead being wound around the bobbin in the vertical direction VD. As illustrated in FIG. 3, the lower end of the bobbin is inserted to a fixing groove 111 to be fixed.

Naturally, the coil member 200 may be fixed to the bottom plate 110 by applying an adhesive or the like to the bottom plate 110.

This coil member 200 is connected to a control unit (not illustrated) of the mobile terminal or the like, and thus is received power from the control unit.

Meanwhile, the vibrating body 300 is disposed on the outside of the coil member 200 of the receiving portion 121 and is mounted in a movable manner in the lateral direction.

Specifically, the vibrating body 300 includes a support plate 310, a first magnet 331, a second magnet 332, a third magnet 333, a fourth magnet 334, a first magnetic body 323, a second magnetic body 324, a first weight 341, and a second weight 342.

The support plate 310 has a hexahedron shape with an upper end being opened and in the inside of thereof, provided a seating space in which the first magnet 331, the second magnet 332, the third magnet 333, the fourth magnet 334, the first magnetic body 323, the second magnetic body 324, the first weight 341, and the second weight 342 are mounted, as illustrated in FIG. 2.

The first elastic member 410 and the second elastic member 420 to be described below are mounted on the both sides of the support plate 310 in the horizontal direction HD. The support plate 310 is movably mounted on the receiving portion of the case 100 in the lateral direction by the first elastic member 410 and the second elastic member 420.

Further, a rectangular through hole 311 in which the coil member 200 is inserted is provided in the center portion of the lower end of the support plate 310.

The size of the through hole 311 is greater than that of the coil member 200 and thus the support plate 310 is not interfered with the coil member 200 when the support plate 310 is moved in the lateral direction.

The first magnet 331 and the second magnet 332 have a rectangular shape which is long in the horizontal direction, are fixed to the support plate 310 and are disposed to be spaced apart from each other in one end of the coil member 200 in the vertical direction.

As illustrated in FIG. 5, the polarities of the first magnet 331 and the second magnet 332 have a north pole in the direction facing each other and a south pole in the opposite direction thereof.

In other words, the polarities of the first magnet 331 and the second magnet 332 are disposed to be symmetrical to each other.

The second magnet 333 and the fourth magnet 334 have the same shape as that of first magnet 331, are fixed to the support plate 310 and are disposed to be spaced apart from each other in the other end of the coil member 200 in the vertical direction.

As illustrated in FIG. 5, the polarities of the third magnet 333 and the fourth magnet 334 have a north pole in the direction facing each other and a south pole in the opposite direction thereof.

In other words, the polarities of the third magnet 333 and the fourth magnet 334 are disposed to be symmetrical to each other.

When the polarities of the first magnet 331 and the second magnet 332 have north poles in the direction facing each other and south poles in the opposite direction thereof, the polarities of the third magnet 333 and the fourth magnet 334 must have north poles in the direction facing each other and south poles in the opposite direction thereof. At this time, a magnetic field lines emanating from the north poles of the first magnet 331, the second magnet 332, the third magnet 333, and the fourth magnet 334 are converged to the coil member 200.

Meanwhile, the first magnetic body 323 is formed of SPCC material, that is, a ferromagnetic material and has a rectangular parallelepiped shape which is long in the vertical direction VD. The first magnetic body 323 is disposed one end of the coil member 200 in the horizontal direction HD in which the first magnet 331 and the second magnet 333 is disposed, as illustrated in FIG. 4, that is, on the left side of the first magnet 331 and the third magnet 333 and is fixed the support plate 310.

In other words, the first magnetic body 323 is made of one body and the both ends of the first magnetic body 323 in the vertical direction VD are in contact with the first magnet 331 and the third magnet 333 respectively.

Further, as illustrated in FIGS. 2 and 7A, a semi-circular shape of an magnetic force enhancing groove 323a is provided in the outside of the first magnetic body 323.

The magnetic force enhancing groove 323a is provided on the upper end and the lower end of the first magnetic body 33 respectively and is recessed in the center direction of the first magnetic body 323.

The magnetic force enhancing groove 323a enhances the strength of the magnetic force and thus causes the driving force of the vibrating body 300 to be improved when the first magnetic body 323 is magnetized.

Naturally, in some case, as illustrated in FIG. 7B, the first magnetic body 323 may be made of one body having a rectangular shape without the enhancing groove 323a. As illustrated in FIG. 7c, the first magnetic body is separated into two magnetic bodies in the vertical direction VD and thus the two magnetic bodies is space apart from each other in the vertical direction VD and may be mounted in a state where the two magnetic bodies are in contact with the first magnet 331 and the third magnet 333 respectively.

However, the first magnetic body 323 with the magnetic force enhancing groove 323a has a higher force according to the displacement distance of the vibrating body 300 than the first magnetic body 323 without the magnetic force enhancing groove 323a has.

Accordingly, it is a more preferable to using the type of the first magnetic body 323 with the magnetic force enhancing groove 323a illustrated in FIG. 7A than that the type of the first magnetic body 323 without the magnetic force enhancing groove 323a illustrated in FIG. 7B is used.

Naturally, the force generated in the type of the first magnetic body 323 illustrated in FIG. 7C is higher than the force generated in the type of the first magnetic body 323 illustrated in FIG. 7A. However, since the type of the first magnetic body 323 illustrated in FIG. 7C is separated two magnetic bodies from each other, the type of the first magnetic body 323 illustrated in FIG. 7C has a poor assembly performance and thus the cost is higher than that of the type of the first magnetic body 323 illustrated in FIG. 7A. Accordingly, it is more preferable to using the type of the first magnetic body 323 with the magnetic force enhancing groove 323a illustrated in FIG. 7A than the type of the first magnetic body 323 illustrated in FIG. 7C.

Meanwhile, the second magnetic body 324 is formed of SPCC material and has a rectangular parallelepiped shape which is long in the vertical direction VD as the first magnetic body 324. The second magnetic body 324 is disposed on the other end of the coil member 200 in the horizontal direction HD in which the second magnet 332 and the fourth magnet 334 is disposed, that is, on the right side of the second magnet 332 and the fourth magnet 334 as illustrated in FIG. 4 and is fixed the support plate 310.

Further, the magnetic force enhancing groove 324*a* described above is formed on the upper end and the lower end of the second magnetic body 324. The effect and the function of the magnetic force enhancing groove 324*a* are same as those of the magnetic force enhancing groove 323*a* and thus are not described in detail.

The vibrating body 300 having a construction described above forms four magnetic force lines having a closed structure by magnetism as arrow directions illustrated in FIG. 5.

The vibrating body 300 becomes a negative stiffness state at the time of vibrating by the structure of these magnetic force lines and the structures of the first elastic member 410 and the second elastic member 420 to be described below.

In other words, when power is applied to the coil member 200, the vibrating body 3000 becomes a stable state in a predetermined region of the displacement distance (mm) of the vibrating body 300 in the lateral direction. In the stable state, the difference between the force N of the magnetic force generated in the vibrating body 300 and the elastic force of the first elastic member 410 and the second elastic member 420 from each other is lower than ±1.

Further, the force that causes the vibrating body 300 to be disposed on the center of the coil member 200 is generated in the vibrating body 300 by the structure of the magnetic field of the vibrating body 300.

As described above, when the vibrating body 300 becomes a negative stiffness state, a damping value of the vibrating body 300 is increased, and thus the reaction rate of the vibrating body 300 according to signal of the control unit is faster.

Here, as a result of measuring the reaction rate of the vibrating motor of the related art and the haptic actuator of the present invention, the vibrating motor of the related art has the reaction rate of about 27.5 ms and the haptic actuator according to the embodiment of the present invention has the reaction rate of about 5.5 ms.

The haptic actuator according to the embodiment of the present invention has a greater acceleration and a wider reaction frequency range than the vibrating motor of the related art.

As described above, performance of a frequency band width or the like of the haptic actuator according to the embodiment of the present invention by the magnetic field structure of the vibrating body 300 according to the embodiment of the present invention is considerably superior to that of the vibrating motor of the related art and particularly the reaction rate of the haptic actuator according to the embodiment of the present invention is faster than that of the vibrating motor of the related art.

Further, when the reaction rate of the haptic actuator is faster, an output corresponding to the various input signal patterns in the mobile terminal in which the haptic actuator is applied is quickly generated and transmitted, and thus quality and performance of the mobile terminal are improved.

Meanwhile, the first weight 341 has a rectangular parallelepiped shape as illustrated in FIGS. 2 and 4, and is formed of tungsten. The first weight 341 is disposed on the right side of the first magnetic body 323 and fixed to the support plate 310.

The second weight 342 has the same shape and is formed of the same material as the first weight 341. The second weight 341 is disposed on the left side of the second magnetic body 324 and fixed to the support plate 310.

These the first weight 341 and the second weight 342 causes the vibrating body 300 to have the same resonant frequency as the frequency of the power applied to the coil member 200 and provides an effect to the acceleration of the vibrating body 300. When the power is applied to the coil member 200, the vibrating body 300 is translated in the lateral direction by interaction between the magnetic force lines generated on the vibrating body 300 and the magnetic force lines generated around the coil member 200 and thus vibration is generated.

The first elastic member 410 and the second elastic member 420 are mounted between the both ends of the horizontal direction HD of the vibrating body 300 and the case 100.

Specifically, the first elastic member 410 is a leaf spring having a wave shape in the vertical direction VD and both ends of the first elastic member 410 are fixed to the left side of the support plate 310 and the cover 120 respectively.

The second elastic member 420 is a leaf spring having a wave shape in the vertical direction VD as the first elastic member 410 and both ends of the second elastic member 420 are fixed to the right side of the support plate 310 and the cover 120 respectively.

The first elastic member 410 and the second elastic member 420 support the vibrating body 300 in the horizontal direction HD, that is, in the lateral direction thereby facilitating a translation movement in the lateral direction of the vibrating body 300.

Further, the first elastic member 410 and the second elastic member 420 are made of a leaf spring having a wave shape in the vertical direction VD and thus prevent the vibrating body 300 from sagging toward the bottom plate 110 by the weight of the vibrating body 300.

Meanwhile, the third elastic member 510 and the fourth elastic member 520 have a rectangular parallelepiped shape and are mounted on the both sides of the coil member 200 in the horizontal direction HD respectively and are formed of a rubber material having elastic force.

When the vibrating body 300 translates in the horizontal direction HD, these the third elastic member 510 and the fourth elastic member 520 cause repulsive force by the collision between the vibrating body 300 and the third elastic member 510 and the fourth elastic member 520 thereby increasing the acceleration of the vibration body 300.

Further, third elastic member 510 and the fourth elastic member 520 have a function of sound-absorbing material that reduces generation of the noise at the time of collision between the vibrating body 300 and the third elastic member 510 and the fourth elastic member 520.

Accordingly, the third elastic member 510 and the fourth elastic member 520 are mounted on the both sides of the coil member 200 respectively, and thus the acceleration of the vibrating body is increased. According to this, the reaction rate of the haptic actuator is more increased and the generation of the noise is reduced.

The haptic actuator according to the embodiment of the present invention having the construction described above causes the vibrating body 300 to be translated in the left direction or in the right direction and thus the first weight 341 and the second weight 342 is oscillated thereby generating vibration when power having a constant frequency is applied to the coil member 200 through the control unit, as illustrated in FIG. 6.

Here, Four magnetic force lines having a closed structure by arranging the magnetic pole in the vibrating body 300 is generated, the vibrating body 300 becomes a negative stiffness state, a damping value of the vibrating body 300 is increased, and thus the reaction rate of the vibrating body 300 according to signal of the control unit is faster by the interrelation between the first elastic member 410 and the second elastic member 420.

INDUSTRIAL APPLICABILITY

While the present invention has been described with respect to the specific embodiments, it will be apparent to those skilled in the art that various changes and modifications may be made without departing from the spirit and scope of the invention as defined in the following claims.

The invention claimed is:

1. A haptic actuator, comprising:
a case forming an accommodation space in an inside thereof;
a coil member fixed to the case, wound on the case in a vertical direction, and connected to a control member; and
a vibrating body disposed on an outside of the coil member and elastically and movably mounted in the accommodation space in a horizontal direction,
wherein the vibrating body comprising:
a first magnet and a second magnet that are disposed on one end of the coil member in the vertical direction to be spaced apart from each other;
a third magnet and a fourth magnet that are disposed on another end of the coil member in the vertical direction to be spaced apart from each other;
a first magnetic body that is mounted on one end of the first magnet and the third magnet in the horizontal direction;
a second magnetic body that is mounted on one end of the second magnet and the fourth magnet in the horizontal direction; and
a first weight and a second weight that are mounted on the first magnetic body and the second magnetic body respectively,
wherein polarities of the first magnet and the second magnet have a north pole in a direction facing each other and a south pole in an opposite direction thereto, and polarities of the third magnet and the forth magnet have a north pole in a direction facing each other and a south pole in an opposite direction thereto,
wherein a magnetic field line emanating from the north poles of the first magnet, the second magnet, the third magnet, and the fourth magnet is to be converged to the coil member,
wherein the first magnetic body is separated into two magnetic bodies, and the two magnetic bodies are spaced apart from each other and are disposed on the first magnet and the third magnet respectively, and
wherein the second magnetic body is separated into two magnetic bodies, and the two magnetic bodies of the second magnetic body are spaced apart from each other and are disposed on the second magnet and the fourth magnet respectively.

2. The haptic actuator according to claim 1,
wherein a first elastic member and a second elastic member which elastically support the vibrating body in the horizontal direction are mounted between two ends in the horizontal direction of the vibrating body and the case, respectively, and
wherein the first elastic member and the second elastic member are a leaf spring that is bent to be have a wave shape.

3. The haptic actuator according to claim 2,
wherein the vibrating body further comprising:
a support plate in which a through hole in which the coil member is inserted is provided and in which a seating space on which the first magnet, the second magnet, the third magnet, the fourth magnet, the first magnetic body, the second magnetic body, the first weight and the second weight are mounted is provided, and
wherein the first elastic member and the second elastic member are mounted between the two ends in the horizontal direction of the support plate and the case respectively, and elastically support the support plate in the horizontal direction.

4. The haptic actuator according to claim 1, wherein a third elastic member and a fourth elastic member which cause acceleration of the vibrating body to be increased by a repulsive force when the vibrating body collides with the vibrating body is provided in the both one end and another end in the horizontal direction of the coil member, respectively.

5. A haptic actuator, comprising:
a case forming an accommodation space in an inside thereof;
a coil member fixed to the case, wound on the case in a vertical direction, and connected to a control member; and
a vibrating body disposed on an outside of the coil member and elastically and movably mounted in the accommodation space in a horizontal direction,
wherein the vibrating body comprising:
a first magnet and a second magnet that are disposed on one end of the coil member in the vertical direction to be spaced apart from each other;
a third magnet and a fourth magnet that are disposed on another end of the coil member in the vertical direction to be spaced apart from each other;
a first magnetic body that is mounted on one end of the first magnet and the third magnet in the horizontal direction;
a second magnetic body that is mounted on one end of the second magnet and the fourth magnet in the horizontal direction; and
a first weight and a second weight that are mounted on the first magnetic body and the second magnetic body respectively,
wherein polarities of the first magnet and the second magnet have a north pole in a direction facing each other and a south pole in an opposite direction thereto, and polarities of the third magnet and the forth magnet have a north pole in a direction facing each other and a south pole in an opposite direction thereto,
wherein a magnetic field line emanating from the north poles of the first magnet, the second magnet, the third magnet, and the fourth magnet is to be converged to the coil member,
wherein the first magnetic body is made of one body and two ends of the first magnetic body are in contact with the first magnet and the third magnet respectively,
wherein the second magnetic body is made of one body and two ends of the second magnetic body are in contact with the second magnet and the fourth magnet respectively, and wherein magnetic force enhancing grooves which are recessed in a center direction are provided to an upper end and a lower end of the first magnetic body and the second magnetic body respectively.

* * * * *